Oct. 10, 1961 J. J. McGLEW 3,004,118

MULTIPLE CONNECTOR

Filed Jan. 9, 1959 2 Sheets-Sheet 1

INVENTOR
JOHN J. McGLEW

Oct. 10, 1961 J. J. McGLEW 3,004,118

MULTIPLE CONNECTOR

Filed Jan. 9, 1959 2 Sheets-Sheet 2

INVENTOR
JOHN J. McGLEW

3,004,118
MULTIPLE CONNECTOR

John J. McGlew, 432 Terrace Ave., Hasbrouck Heights, N.J.

Filed Jan. 9, 1959, Ser. No. 785,870
11 Claims. (Cl. 200—51.05)

This invention relates in general to electrical connectors and in particular to a new and useful apparatus and method for connecting a plurality of electrical terminals into circuit.

Heretofore, it has been known to provide apparatus for facilitating the interconnection or circuit connection of electrical terminals by means of a single connector, however, such devices were limited in the range of circuits which could be selected. Additionally, no means were provided for connecting to two or more circuits at the same time. Such devices did not include any means for rapidly selecting a circuit for connection or for indicating precisely what circuits were interconnected. With the advent of very small size electronic circuits which require interconnection and alternate circuit connection, great need has arisen for a simple connector which can be utilized to connect a multiplicity of circuits in circuitry with accuracy and speed. Similarly, with large size cable connectors there is a need for a connector to permit selective circuit connection in a few moments, while also providing complete insulation without applying insulation sleeves, sealing materials, etc.

The present invention includes in one embodiment a connection block made up of alternate layers of insulating and conducting materials. The block includes a plurality of apertures provided to receive a connector-cam terminal plug of conductive material. The cam terminal plugs include one or more cam connectors which may be advantageously offset along the length of the plug so that after the plug is inserted in an opening, the degree of rotation of the plug controls the position of the cam in respect to one of the conductive layers in the block. The plug may be rotated to connect it electrically to one, two or more conductive layers as desired. The block conductive layers may be advantageously connected to a source of electrical energy or additional circuitry and they are effective to permit inter-connection of all types of circuits within a few minutes.

In accordance with another embodiment of the invention, the blocks are provided with indexing marks and the plugs are provided with indicia to indicate by the positions of the plug in the block, the number of conductive layers are connected thereto. The circuit connections can be controlled by numbers, letters or other indicia on the plug, to indicate at a glance the amount which a given plug should be rotated once it is positioned in the block in order to connect it to the proper circuit.

In accordance with another aspect of the invention, the terminal blocks of alternate layers of conductive and insulating material are made uniform and a multiplicity of cam plug terminals are fashioned with the cams thereon arranged in varying degrees of stagger in respect to the axis thereof, so that insertion of the plug into the block and rotation into a locking position will effect accurate circuit connection as determined by the cam arrangement. The positioning of the cams will determine which ones will be electrically connected to a conductive layer in the block when the plug is in position.

In accordance with another aspect of the invention, the terminal plug cam is provided with a resilient material arranged to cover the opening in the block when the plug is positioned therein. The resilient material may be compressed to form a tight insulation seal by an inward camming action of the plug as the plug is positioned by rotation thereof.

In still another aspect of the invention, there is provided a terminal member and block circuit-plate combination in which the block is provided with a plurality of openings adapted to receive the terminal member. The terminal members may be inexpensive castings having any desired arrangement of an infinite member of cam contact configurations adapted for contact with any one of a plurality of conductive plates in the block. The terminal members are affixed to the end of a wire requiring connection and depending on the terminal member configuration, one or more preselected plates are connected when the terminal member is connected to the block.

A further object of the invention is to provide an electrical connector adapted for attachment to a multiple conductor block including means for simultaneously connecting the connector to one or more circuits and providing a complete insulation seal at the connection.

A still further object is to provide a multiple connector and a cable terminal member with a contact surface which cooperates with the connector wherein the terminal member is rotated into electrical and mechanical clamping engagement.

In this specification and in the accompanying drawings, there are described and shown various embodiments of the methods and apparatus of the invention and various modifications thereof are indicated, but it is to be understood that these are not intended to be exhaustive nor limiting of the invention, but on the contrary, are given for purposes of illustration in order that others skilled in the art may fully understand the invention and the manner of applying the method and apparatus for manufacturing electrical connectors and terminal blocks, and so that they may modify and adapt the invention in various forms, each as may be best suited to the conditions of a particular use.

The various advantages and objects of the present invention will be more fully understood from a consideration of the following description in conjunction with the accompanying drawings, in which.

Figure 1:
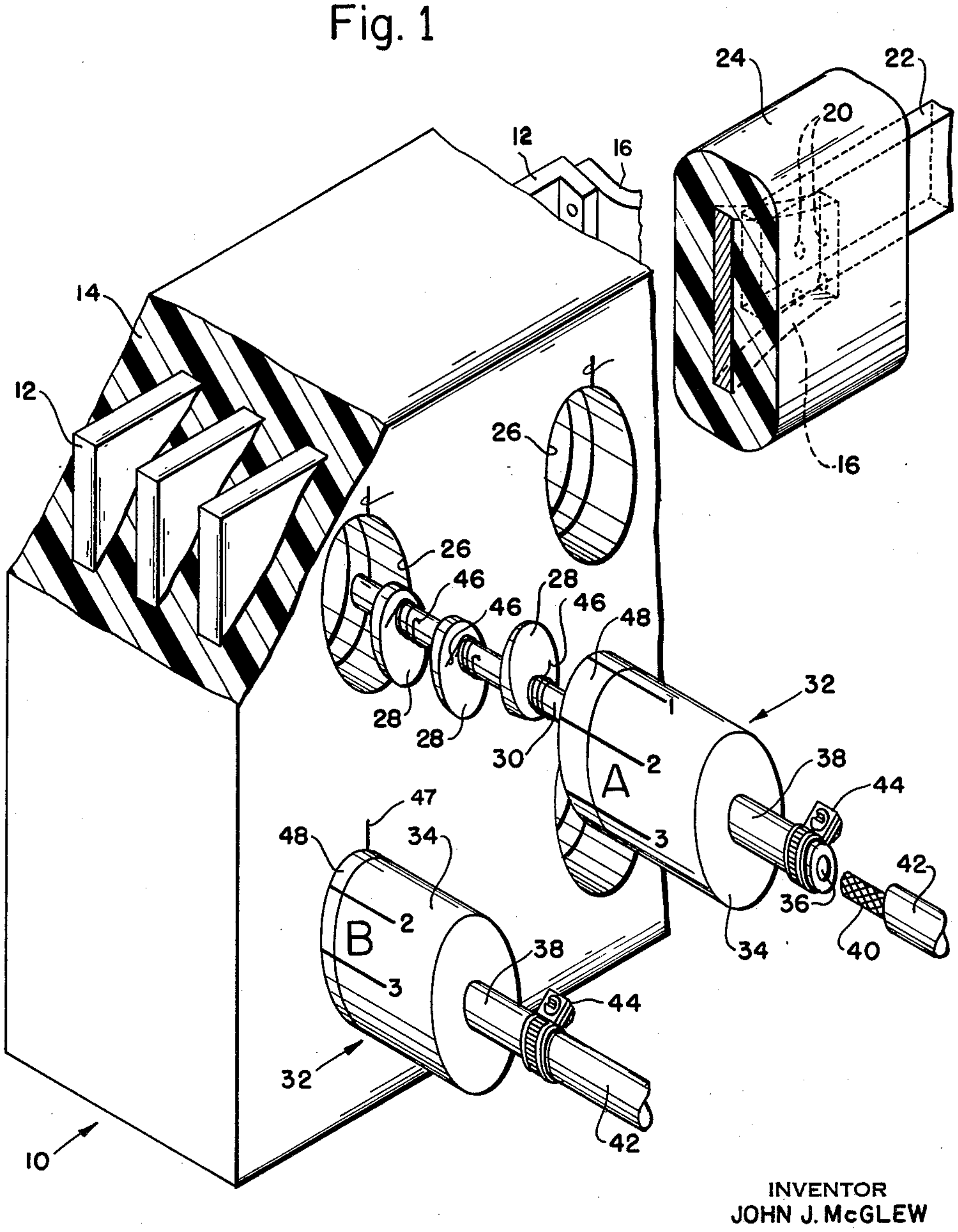
FIG. 1 is a fragmentary perspective view of an electrical terminal block and connector terminal member constructed in accordance with the invention.

Referring to the drawings in particular, the invention as embodied therein in FIG. 1, includes a terminal block generally designated 10, which comprises a plurality of conductive plate elements generally designated 12 spaced apart by insulation material 14. At one end of the block 10 the plate elements 12 are narrowed as at 16 and are provided with a plurality of threaded openings to receive bolts of individual bus bars 22. Only one bus bar 22 and narrowed portion 16 is shown for clarity of illustration purposes but each plate 12 may be similarly connected. An insulation sleeve 24 is advantageously slid over the exposed conductor narrowed portion 16 and the bus bar 22.

In accordance with the invention, the block 10 is provided with a plurality of circular openings 26 of a size to receive disc-shaped cam contact members 28 which are rotatable on a central conductive portion 30 of a contact terminal member generally designated 32. The contact terminal member 32 includes a widened cylindrical portion 34, the outer portion of which is made of insulation material. The central part of the portion 34 is conductive and extends into the conductive portion 30 and to a conductive portion 36 at the opposite end. The conductive portion 36 is covered with insulation 38 and is hollowed to receive the exposed end 40 of a cable 42. The widened portion of the cable 42 is clamped in position by a screw ring clamp 44.

Figure 3:
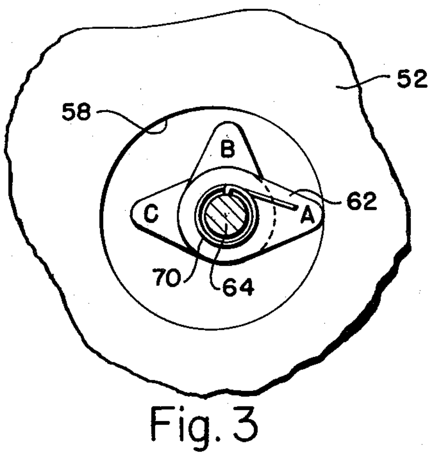
FIG. 3 is a fragmentary section taken on the line 3—3 of FIG. 2.

The conductive cam contacts 28 are arranged in radial offset positions on the conductive central portion 30 (such as is indicated in FIG. 3) and biased into these positions against stops on portions 30 (not shown) by coil springs 46 which are secured at one end on the cam contacts 28 and at their opposite ends on the central member 30.

The contact terminal member 32 is indicated at A in position for insertion into an opening 26 of the terminal block 10. The contact cams 28 are spaced to align with the conductive plates 12 when positioned as indicated at B. When the contact terminal member 32 is positioned to align the numeral 1 with an index mark 47 only one cam-contact 28, for example the outer one, is moved to a position at which it contacts a conductive plate 12. When the contact terminal member 32 is rotated further, the first contact member 28 is held against a portion of the conductive plate 12 as the spring 46 is wound. The contact terminal may be rotated to align the numerals two and three with the index 47, at which points the other two cam-contacts 28 will be brought into respective contact with the conductive plate 12. Thus, the number of conductive plates 12 which are contacted by a contact terminal member 32 will depend on how much it is rotated when it is positioned in the opening 26.

Figure 4:
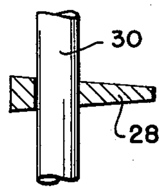
FIG. 4 is a fragmentary section of another embodiment of contact cam member.

The outer surface of the cam contacts 28 (see FIG. 4) and the inner surfaces of the contact plates 12 are beveled so that the contact terminal member 32 becomes wedged in place when one or more cam contacts 28 are rotated into contact with the conductive plates 12. Each of the inner central portions 34 are provided with a layer of resilient insulation material 48 which tightly seals the opening 26 when the contact terminal members 32 are rotated into place.

The arrangement described permits easy assembly and electrical connection of the cable 42 to any one of a plurality of plates by merely pushing the cam contacts in the openings 26 and rotating the cam contacts 28 into wedging contact with one or more contact plates 12. The connector assembly is sealed against moisture by the resilient layer 48. The arrangement permits connection of the cable 42 to an infinite variety of circuits without making each connection separately.

Figure 2:
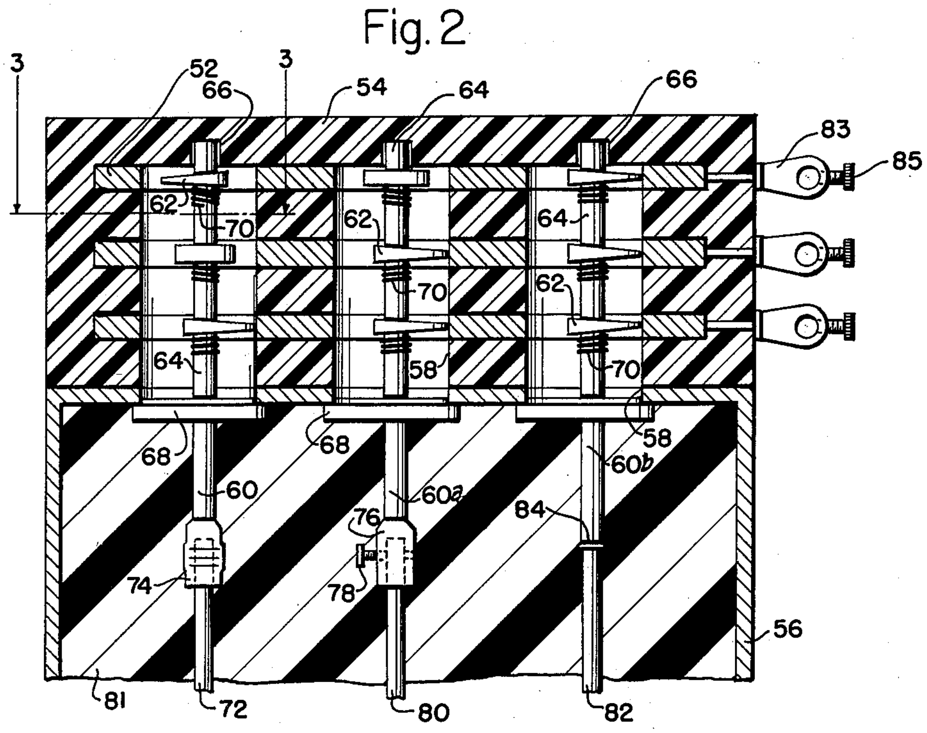
FIG. 2 is a transverse section through the center of the connector openings of another embodiment of the invention.

In the embodiment illustrated in FIGS. 2 and 3, a terminal block 50 is shown comprising a portion of alternate layers of conductive plates 52 and insulation material 54 and an open end case portion 56. The interior of the case portion 56 is provided with a plurality of openings 58 to receive contact terminal plugs generally designated 60, 60*a* and 60*b*. Each of the contact terminal plugs is provided with at least one cam contact 62 which is rotatably held on an elongated portion 64 of the plug 60, but is held against axial movement therealong. The ends of the plugs 60 are centered in recesses 66 at the inner end of the terminal block 50. A covering plate 68 is provided on each plug 60 to cover the openings 58 when the plugs 60 are positioned therein. The amount the plugs 60 are rotated after insertion determines the number of conductive plates 52 which are electrically connected thereto. This is advantageously indicated by an index mark on the interior of the case portion 56 and a numerical indication on the cover plates 68.

The contact cams 62 are advantageously radially offset as indicated in FIG. 3 so that slight rotation of the plug 60 brings contact A into electrical contact with its plate 52. Further rotation of the plug 60 brings the next contact B into electrical contact with its plate 52, while a coil spring 70 secured to the cam contacts and the elongated portion 64, permits continued rotation of the plug as the first contact A biases the spring. Further rotation and further biasing of the cam contacts A and B may be made until the contact C is brought into contact with its plate 52. Thus, it is possible to connect each plug 60 into electrical contact with one, two or three contact plates 52 as desired.

The plug 60 is connected to a cable 72, which is inserted into a hollowed widened portion 74 and held therein by crimping the outer wall. The plug 60*a* is provided with a hollowed end portion 76 including a set screw 78 to secure a cable 80 therein. Another manner of connecting a cable 82 to the plug 60*b* is by welding as at 84.

After the plugs 60, 60*a* and 60*b* are connected to the terminal block 50, the cables 72, 80 and 82 and the plugs are potted with a resin material 81 which is placed in the case portion 56. Each plate 52 is connected to an external terminal jack 83 having an adjustable screw 85 to clamp additional cables thereto.

Figure 5:
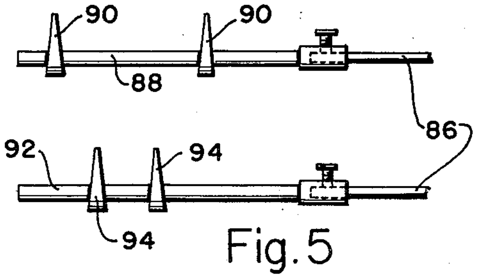
FIG. 5 is a side elevation of two types of terminal members in accordance with the invention.

In FIG. 5, there is indicated small copper wire conductors 86, one of which is connected to a terminal plug 88 having two fixed cam contacts 90 which are widely spaced but radially aligned, the other of which is connected to a terminal plug 92 and is provided with two closely spaced cam contacts 94 which are radially aligned. In this embodiment, the terminal plugs 88 and 90 are inexpensive cast plugs made to a configuration which will effect connection of one or more conductor plates in accordance with the location and number of the cam contacts. Thus, an infinite variety of contact plugs may be provided for cooperation with terminal blocks of one or more conductive plate layers. Thus, if, for example, a 10-plate conductive plate terminal block is provided, plugs may be made with cam contacts to connect any variation of one to ten plates to the plug when it is inserted into the block and rotated to a connected position. This is a particularly advantageous manner of connecting small sized electronic components where a multiplicity of small sized units must be selectively connected electrically. By marking each terminal plug 88 and 90 or with a designation number indicating the circuits which will be connected when it is inserted in the terminal block, infinite circuit arrangements can be accomplished at once.

While in accordance with the provisions of the statutes there is illustrated and described herein the best forms of the invention now known, those skilled in the art will understand that changes may be made in the form of apparatus disclosed without departing from the spirit of the invention covered by the claims.

What is claimed as new and desired to be secured by Letters Patent of the United States is:

1. A conductor terminal for connection to a block of alternate layers of conductive and insulation materials comprising an elongated body portion, and a plurality of cam-contact portions extending laterally from said elongated body portion, said cam-contact portions being spaced along the length of said body portion and being angularly offset to present contact portions in alignment with the conductive layers of said block in dependence upon the angular disposition thereof when positioned in said block for connection thereto.

2. A conductor terminal according to claim 1 including mechanical clamping means for attaching a conductor thereto.

3. A conductor terminal according to claim 1 including spring means connecting said cam-contact portions and said body portion, said cam-contact portions being angularly offset, each of said cam-contact members being rotatable on said body member whereby the first ones of said cam-contact members to contact a conductive layer of said block is biased by said spring means when said body means is rotated in said block.

4. A terminal block and multiple connector combination comprising a plurality of conductive plates separated by insulation, a plurality of openings in a face extending inwardly past said plates, conductor terminal centering means on said blocks, a conductor terminal positioned to cooperate with said centering means, said conductor terminal including at least two angularly offset cam-contact members extending laterally therefrom, said conductive plate openings being complementarily offset whereby depending on the angular disposition of said conductor terminal one or more of said contact members will be in conductive communication with a preselected conductive plate.

5. A terminal block and multiple connector combination according to claim 4 including spring means connecting said cam-contact members and said conductor terminal, said conductor terminal being rotatable in said block to bias said cam-contacts into contact with said conductive plates, said contacts being angularly offset whereby a predetermined number of plates are connected to said conductor terminal depending on the amount it is rotated in said block.

6. A terminal block and multiple connector combination according to claim 4 wherein said conductor terminal includes widened cylindrical insulated portion and an elongated conductive core extending from said insulated portion into said block.

7. A terminal block and multiple connector combination according to claim 6 including resilient sealing means between said insulated portion and said block closing and sealing the associated opening in said block.

8. A terminal block and multiple connector combination according to claim 7 including a mechanical cable-clamping portion connected to said conductive core at the opposite end thereof from the portion extending into said block.

9. A terminal block and multiple connector combination according to claim 4 wherein each of said conductive plates is separately electrically connected.

10. A terminal block and multiple connector combination according to claim 4 wherein said block includes wall portions extending outwardly from the face having openings therein to define a container-portion adjacent said openings, said container-portion being filled with insulation after said terminal conductors are positioned therein.

11. A terminal block and multiple connector combination according to claim 4 wherein said cam-contact members and the adjacent areas of said conductive plates are complementarily beveled to wedge said conductor elements in position in said block when they are rotated into position.

References Cited in the file of this patent

UNITED STATES PATENTS

| | | |
|---|---|---|
| 249,574 | Blake | Nov. 15, 1881 |
| 274,653 | Perkins | Mar. 27, 1883 |
| 840,537 | Weir | Jan. 8, 1907 |
| 1,235,515 | Chrisman | July 31, 1917 |
| 1,251,618 | Bahls et al. | Jan. 1, 1918 |
| 1,271,221 | Quinn | July 2, 1918 |
| 1,901,040 | Peroni et al. | Mar. 14, 1933 |
| 1,972,306 | Linker | Sept. 4, 1934 |
| 2,434,534 | Alford | Jan. 13, 1948 |
| 2,613,287 | Gieger | Oct. 7, 1952 |
| 2,817,721 | Edwards | Dec. 24, 1957 |
| 2,842,644 | Korsgren | July 8, 1958 |

FOREIGN PATENTS

| | | |
|---|---|---|
| 433,671 | Germany | Sept. 10, 1926 |
| 74,178 | Sweden | May 3, 1932 |